United States Patent Office 3,133,937
Patented May 19, 1964

3,133,937
BASIC ALKOXYALKYL XANTHENE-9-CARBOXY-
LATE AND ITS ACID ADDITION SALTS
Martin A. Davis, Montreal, Quebec, Canada, assignor to
American Home Products Corporation, New York,
N.Y., a corporation of Delaware
No Drawing. Filed Nov. 17, 1961, Ser. No. 153,194
3 Claims. (Cl. 260—335)

This invention relates to a new chemical compound, 2 - (dimethylaminoethoxy)ethyl xanthene - 9 - carboxylate, its acid addition salts, and to the procedure by which these compounds may be prepared from available starting materials.

My new chemical compound, 2-(dimethylaminoethoxy)ethyl xanthene-9-carboxylate, which is readily prepared by interaction of xanthene-9-carbonyl chloride with 2-(dimethylaminoethoxy)ethanol, may be represented by the formula

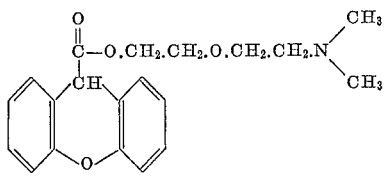

Both in the form of the basic ester, and in the form of its acid addition salts with pharmaceutically-acceptable, non-toxic, acids, these compounds are pharmacologically active. They are characterized by antitussive activity and local anaesthetic action, and possess toxicity of only a relatively low order.

In preparing the new compounds, 2-(dimethylaminoethoxy)ethanol and xanthene-9-carbonyl chloride are brought together, preferably in a mutual solvent such as pyridine.

An elevated temperature, such as one close to 100° C. will speed up the reaction, and the mixture of reactants may therefore advantageously be heated on a steam-bath.

After the reaction mixture is cooled and treated with an aqueous solution of a mild base, such as an alkali metal carbonate, the basic ester appears therein as an oil. It may be collected, washed to remove impurities, dissolved in a suitable organic solvent, and its solution again washed with water. Recovery of the oil from the solvent, as by evaporation, results in the basic ester in purified form.

Acid addition salts are readily prepared by dissolving the basic ester in a suitable solvent and adding a small molar excess of the acid to the solution. The resulting salt is recovered in the usual manner and may be purified, by recrystallization from solution thereof in a suitable solvent.

Further details of my procedure for preparing the new compounds are given in the illustrative example.

Example

Xanthene-9-carbonyl chloride was prepared from xanthene-9-carboxylic acid and thionyl chloride utilizing the procedure described in Cusic U.S.P. 2,650,230.

A solution of 2-(dimethylaminoethoxy)ethanol (6.6 g., 0.05 mole) in dry pyridine (10 ml.) was added over a one-half hour period to xanthene-9-carbonyl chloride (12.2 g., 0.05 mole) dissolved in pyridine (20 ml.). The mixture was stirred on the steam-bath for three hours, cooled, and added to ice-water containing sodium carbonate. The oil which had formed was collected, washed by decantation with water, dissolved in benzene and again washed with water to remove the pyridine. Evaporation of the solvent left 15 grams of an oil which was 2-(dimethylaminoethoxy)ethyl xanthene-9-carboxylate.

This basic ester was then dissolved in acetone and added to a small molar excess of citric acid. Recrystallization of the resulting solid from acetone, or from acetonitrile-ether, gave a sample of 2-(dimethylaminoethoxy)ethyl xanthene-9-carboxylate, citrate salt, M.P. 103–104° C.

Analysis confirmed the empiric formula $C_{26}H_{31}NO_{11}$.—
Required: C, 58.53; H, 5.86; N, 2.63%. Found: C, 58.90; H, 5.91; N, 2.38, 2.70%.

I claim:
1. A compound selected from the group which consists of a compound of the formula:

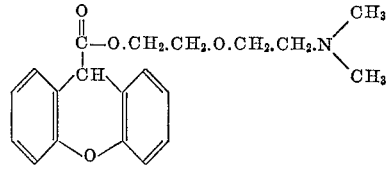

and its citrate salt.

2. 2 - (dimethylaminoethoxy)ethyl xanthene-9-carboxylate.

3. 2 - (dimethylaminoethoxy)ethyl xanthene-9-carboxylate citrate.

References Cited in the file of this patent
UNITED STATES PATENTS

| | | |
|---|---|---|
| 2,334,310 | Burtner | Nov. 16, 1943 |
| 2,659,732 | Cusic et al. | Nov. 17, 1953 |
| 2,948,746 | Stuehmer et al. | Aug. 9, 1960 |
| 2,952,685 | Najer et al. | Sept. 13, 1960 |